Nov. 2, 1943.  E. L. GRAF  2,333,479
PANEL CONVEYING AND STACKING APPARATUS
Filed March 18, 1942   5 Sheets-Sheet 1

INVENTOR.
Edwin L. Graf
BY
Barnes, Kisselle, Laughlin & Raisch
Attorneys.

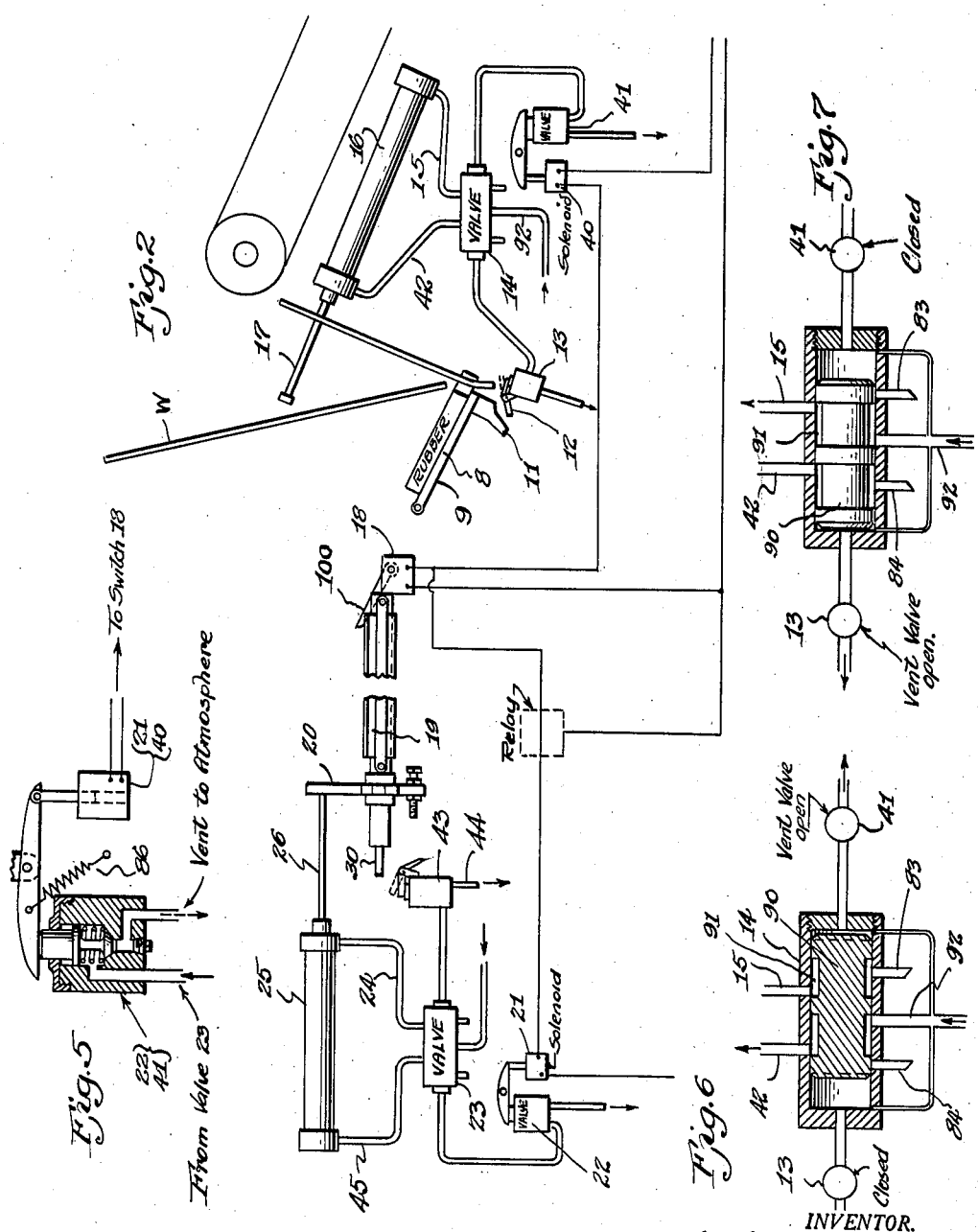

Nov. 2, 1943.　　　　E. L. GRAF　　　　2,333,479
PANEL CONVEYING AND STACKING APPARATUS
Filed March 18, 1942　　　5 Sheets-Sheet 3
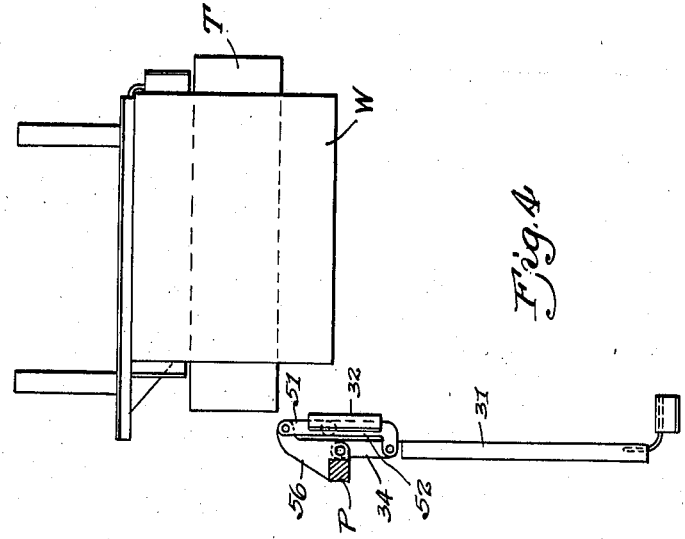
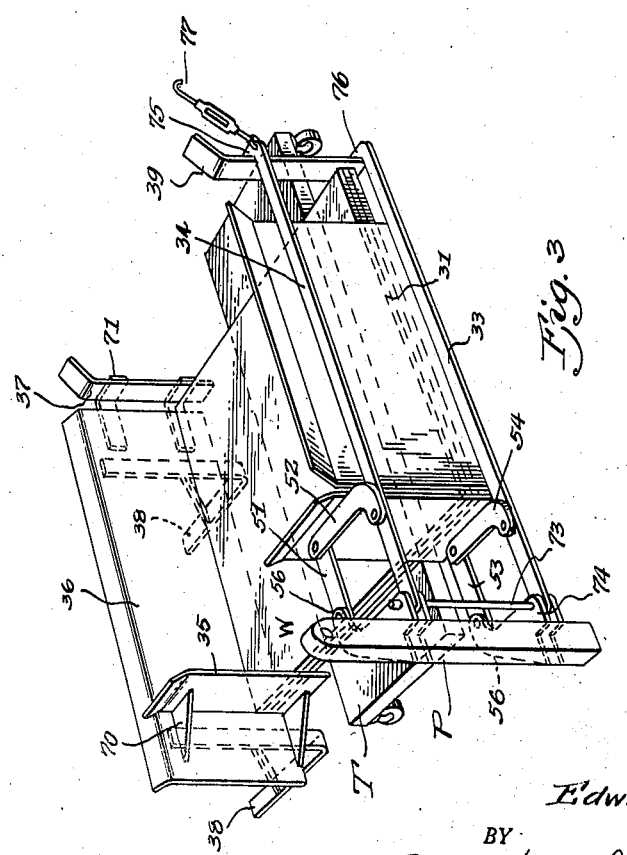
INVENTOR.
Edwin L. Graf
BY
Barnes, Kisselle, Laughlin & Raisch
Attorneys.

Nov. 2, 1943.    E. L. GRAF    2,333,479
PANEL CONVEYING AND STACKING APPARATUS
Filed March 18, 1942    5 Sheets-Sheet 4
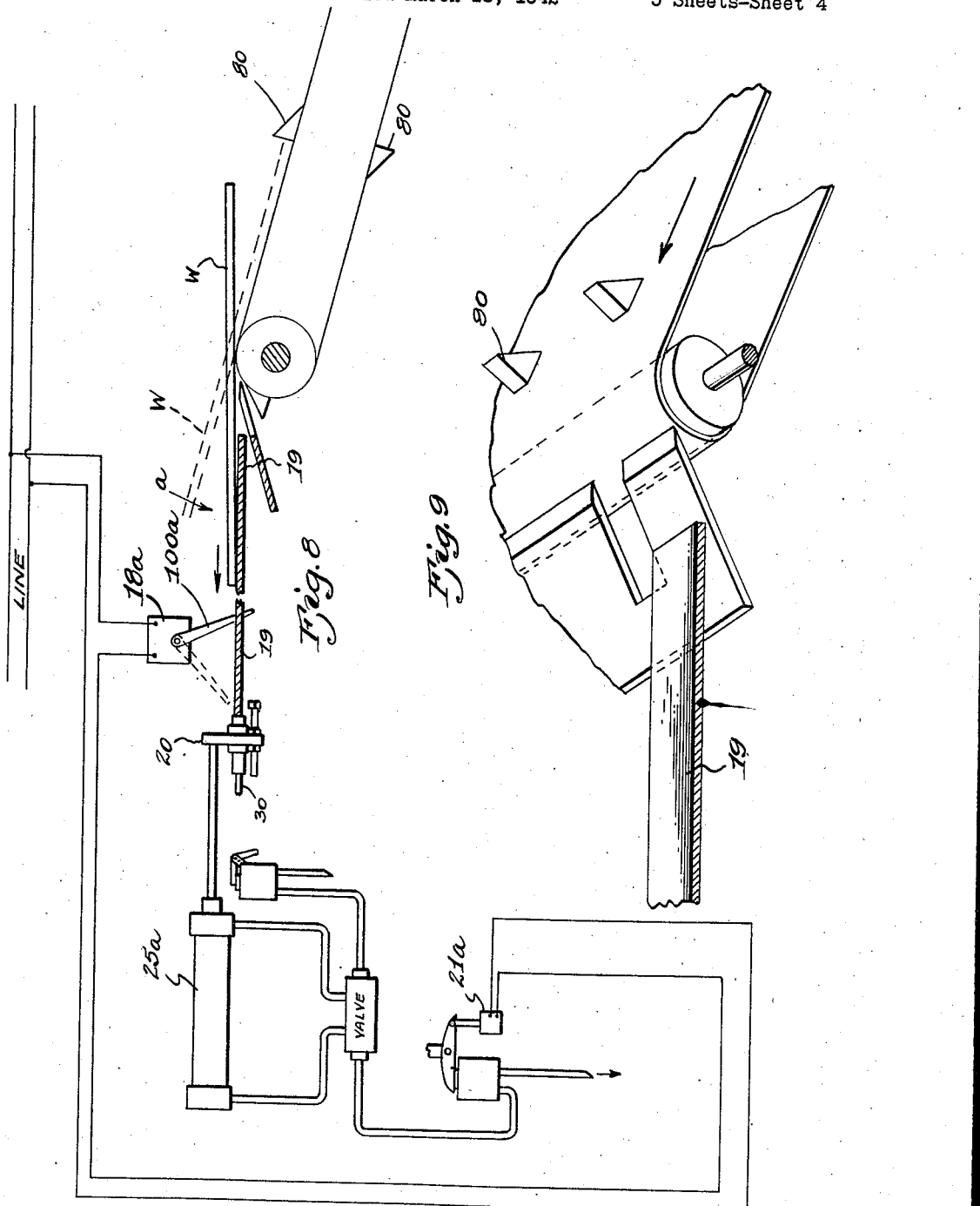
INVENTOR.
Edwin L. Graf
BY Barnes, Kisselle, Laughlin & Raisch
Attorneys.

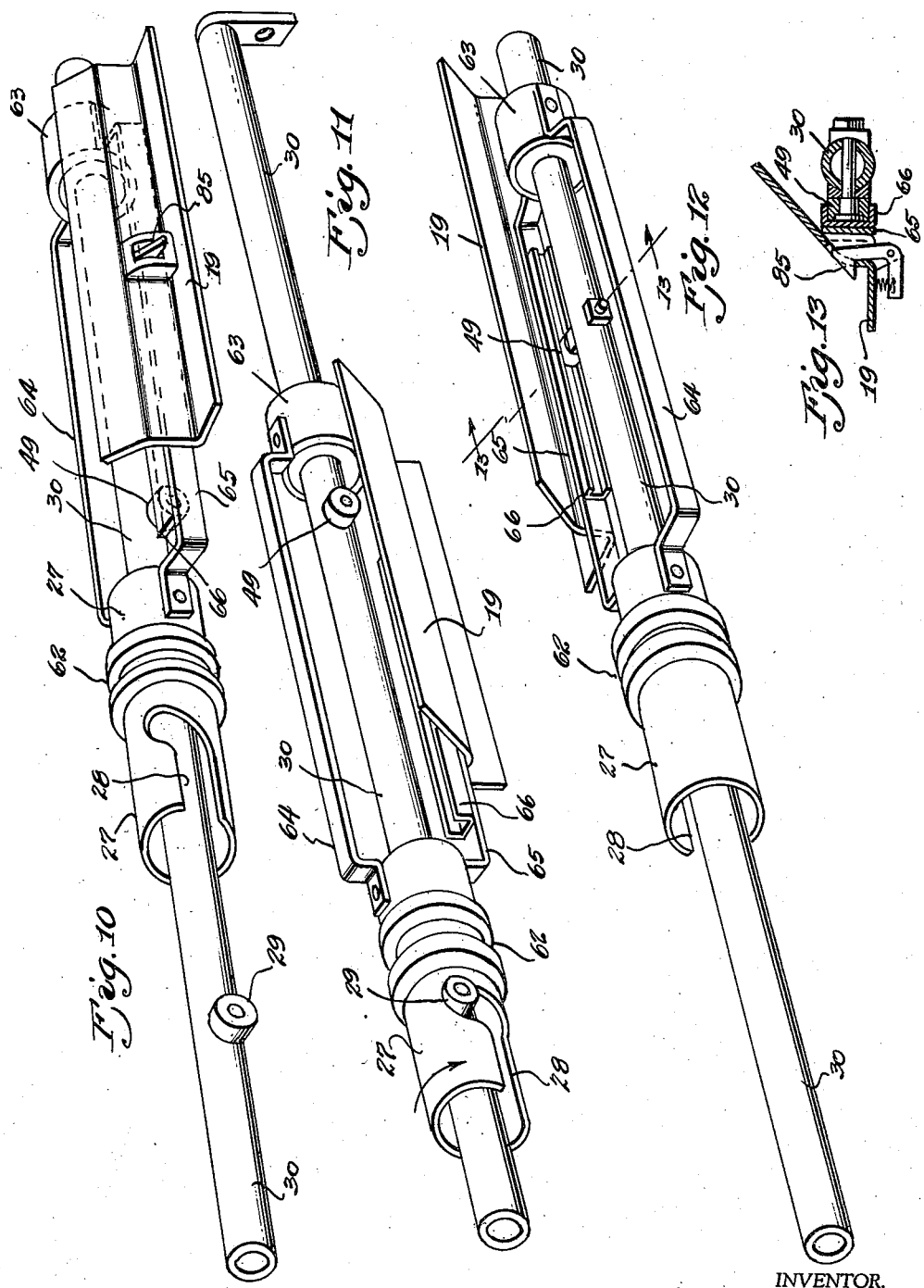

Patented Nov. 2, 1943

2,333,479

UNITED STATES PATENT OFFICE 2,333,479

PANEL CONVEYING AND STACKING APPARATUS

Edwin L. Graf, Rockford, Mich., assignor to General Motors Corporation, Detroit, Mich., a corporation of Delaware Application March 18, 1942, Serial No. 435,155

10 Claims. (Cl. 214—6)

This invention relates to an apparatus for conveying stampings from the press and stacking them.

The apparatus is provided with automatic means for taking the stamping out of the press, dropping it onto a conveyor, depositing the stamping onto a slide which is automatically actuated to move the slide and drop the stamping off the slide onto a stack which is held on a truck contained within the stacking frame. This will be more fully described hereinafter. In the modified form of the invention the panel is not inverted.

In the drawings:

Fig. 2 is a diagram of the apparatus.

Fig. 3 is a schematic perspective of the stacking apparatus in the closed or operative position.

Fig. 4 is a plan view of the same showing the same apparatus with one of the walls swung open to permit the truck with the plates to be moved out.

Fig. 5 is a detail of the solenoid-operated air bleeder valve, two of which are used in the apparatus shown in Fig. 2.

Fig. 6 is a longitudinal section of the main air valve, two of which are used in the apparatus shown in Fig. 2 and designated 14 and 23.

Fig. 7 is a similar view showing the same air valve with a piston in a position to operate the kicker rod that kicks the work panel over.

Fig. 8 is a diagrammatic view of a modified form of the apparatus. In this form the panel is not inverted.

Fig. 9 is a detailed perspective of the end of the conveyor shown in Fig. 8 and the dumper shelf or slide (the latter shown diagrammatically).

Fig. 10 is a detailed perspective view of one of the dumping shelves and the associated stationary shaft.

Fig. 11 is a similar view showing the dumping shelf moving to the left and the shelf in dumping position.

Fig. 12 is a perspective of one of the shelves taken from the rear of the shelf.

Fig. 13 is a section taken on the line 13—13 of Fig. 12.

Figure 1:
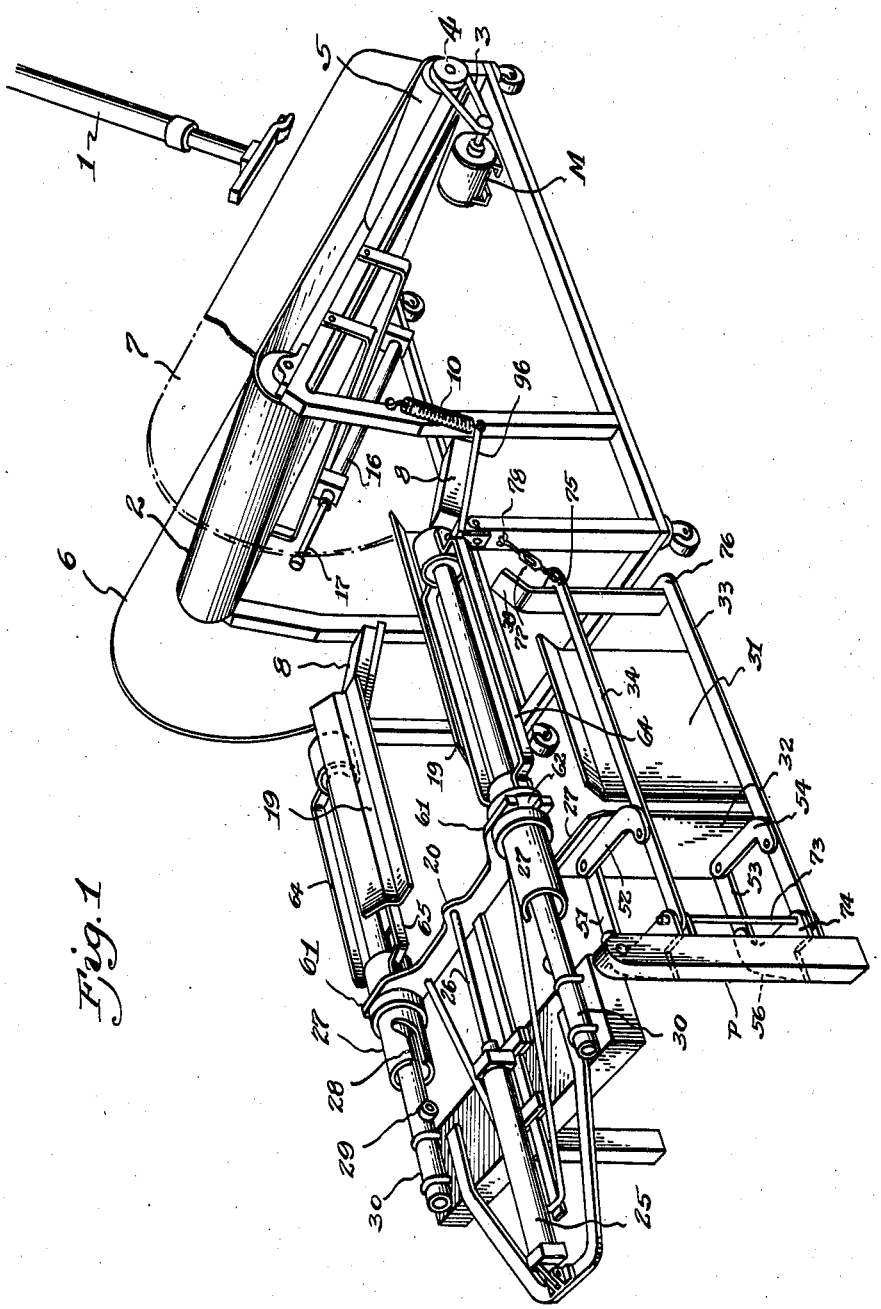
Fig. 1 is perspective of the machine.

1 (Fig. 1) is an ejecting arm which is only shown here graphically as the arm may be of various forms. Suitably operated jaws to grip the panel and pull it out of the press are disclosed and claimed in the Sahlin application, Serial No. 357,453, filed September 1940. This unloading arm automatically takes the stamping from the press and drops it onto the conveyor belt 2 which is driven by the motor M which connects by belt 3 to pulley wheel 4 which drives the roller 5 over which the belt runs. The stamping, which may be a door panel, travels upwardly on the belt until it reaches the top of the conveyor. It is guided by the side walls 6 and 7 to keep it in proper position on the conveyor. It then drops off the upper end of the conveyor onto the rubber blocks 8. These blocks are supported on swinging arms 9 held up by tractile springs 10.

Referring to Fig. 2, when the door panel or work, which is designated W, drops upon the rubber pad 8, the cam 11 strikes the arm 12 of the bleeder valve 13 and bleeds air out of cylinder 14. The air reaches each end of the cylinder through the small tubes shown in Fig. 2. The piston valve 90 moves to the left, as shown in Fig. 7, causing the annular groove 91 to register with the air supply pipe 92. This allows air to pass through pipe 15 to cylinder 16 causing the push rod 17 to be advanced to the position shown in Fig. 2. Here it kicks the work W over. The work falls over on the trip arm 100 of a switch 18 as the work falls onto the shelves 19 of the slide 20. This energizes a solenoid 21 which operates bleeder valve 22 (detailed in Fig. 5) and bleeds air from the left-hand side of the control valve 23 in the same way as described above in connection with valve 14. This causes the valve piston of the valve (as explained above in connection with Figs. 6 and 7) to move to the left and let air into pipe 24 and the right-hand end of cylinder 25. The piston rod 26 is connected with the slide 20. The slide moves to the left carrying with it the work which is supported on the dump shelves.

Referring to Figs. 10 and 11, the operation of the dump shelves will be seen. The cross bar of the slide 20 has forked ends 61 (Fig. 1) which fit in the annular groove 62 of the sleeve 27. Sleeve 63 is connected with the sleeve 27 by means of the spanner bars 64 and 65 which span the space between the two sleeves on either side of the stationary shaft 30. The stationary shaft has fastened thereto a roller 49 which, in Fig. 10, is shown riding in the channel 66. This channel 66 is welded to the spanner bar 65 which in turn is welded to the shelf 19 (see Fig. 12). The roller 49 engages in the channel bar on the shelf as the slide is advanced from right to left. When the right-hand end of the channel bar passes beyond the roller 49, the dump shelf 19 is free to revolve and dump the panel. At this time the slot 28 in sleeve 27 is passed over the roller 29 and the roller enters the oblique end of this cam slot 28 and this causes the shelf to revolve inwardly and drop the panel.

Now referring to Figs. 3 and 4, T designates a truck and W is the work, to wit: a stack of panels. These panels are lined up and stacked on the truck by the stacking frame shown in Figs. 3 and 4, in perspective and plan view, respectively. This stacking frame has on the further side a pair of angle brackets 38 to which are secured the side wall 36 and end walls 35 and 37. These end walls are secured to the side wall 36 by the gusset plates 70 and the angle strips 71. The near part (with respect to one looking at the views) of the stacker comprises an upright post P which supports a pair of brackets 56. On these brackets is supported a pair of swinging arms 51 and 53 to which in turn are pivoted the two arms 52 and 54 which carry the end wall 32 of this part of the stacker. These arms 52 and 54 are pivoted to the long arms 33 and 34 which are in turn pivoted to the pintle 73 which is carried on the brackets 56 attached to post P. The long arms 33 and 34 carry the side wall 31. The ends of the long arms are bent around as at 75 and 76 and carry the end wall 39. All these stacker walls have each a flared upper flange for receiving the panels as they drop from the dump shelves and guiding them into the pile which is defined by the stacker walls.

Referring to Fig. 4 it will be seen that the stacker frame can open up as shown in this figure. The long arms can swing on the pintles 73 carried in the brackets 56 attached to the post P. They swing out to the right-angular position shown in Fig. 4 and in doing this the arms 51 and 52 swing into aligned position and carry with them the end wall 32 which is now parallel with the side wall 31. The truck, together with the stack of panels, may now be wheeled out and an empty truck may be wheeled in place and the stacker frame closed again. The hook 77 may then be hooked over the staple 78 on one of the upright posts of the conveyor frame. This holds the swinging stacker frame part in the proper position to guide the panels and drop them in the stack.

When the switch 18 is operated by the work as it tips over (Fig. 2), it also energizes solenoid 40 which operates the bleeder valve 41 and bleeds air from the so-called "Tompkins-Johnson" control valve 14 (see Figs. 6 and 7). This causes the piston 90 of this valve 14 to move to the right, as shown in Fig. 6, and air is exhausted through 83 and pipe 15 and admitted through pipe 42 to cylinder 16 to move the push rod 17 back to its original position.

When the work is dumped by the dumping shelves 19, this strikes the arm 43 of bleeder valve 44 and bleeds air from the right-hand side of another "Tompkins-Johnson" control valve 23. The details are the same as for valve 14 shown in Figs. 6 and 7, except the piston of the piston valve is reversed end for end. This causes the valve to discharge air from cylinder 25 through pipe 24 and admit air through pipe 45 to cause the rod 26 and the slide 20 to move back to their original position.

These control valves 14 and 23 are known to the trade as "Tompkins-Johnson" and are shown only graphically. The control might be all electrical or might be some other form of control. Fig. 13 shows a latch 85 which holds the stamping in position after it has been dropped upon the dumping shelves.

In the form of the apparatus shown in Figs. 8 and 9, the panel is not inverted. The conveyor has a plurality of lugs 80 which positively propel the panel up a slight incline. The panel is pushed onto the dump shelves 19 and in place of the work dropping onto the switch lever 18a, as in the apparatus heretofore described, the end of the work strikes the switch arm 100a and this trips the switch which controls solenoid 21a which in turn operates the bleeder valve and causes the movement of the piston in the cylinder 25a in the same way as already described with the first type of apparatus. This causes the slide 20 and the dump shelves to move to the left in the same way as already described, thereby bringing the panel over the stacking frame and then at the proper time dropping the panel into the stacking frame, as already described.

What I claim is:

1. A work conveyor and stacking apparatus for panels, having in combination conveying means for conveying the panel to an elevated position and dropping the same off the end of the conveyor and leaving it in upright but leaning position, means for automatically pushing the panel over to reverse the same and a sliding carriage onto which the same drops when reversed, said carriage automatically operated to convey the panel away from said conveying means and dump the same.

2. A work conveyor and stacking apparatus for panels, having in combination conveying means for conveying the panel to an elevated position and dropping the same off the end of the conveyor and leaving it in upright but leaning position, means for automatically pushing the panel over to reverse the same, a carriage onto which the same drops when reversed, said carriage automatically operated to convey the panel away from said conveying means and dump the same and a stacking frame into which the panel can be dropped.

3. A work conveyor and stacking apparatus for panels, having in combination conveying means for conveying the panel to a position and causing the same to leave the end of the conveyor, a carriage onto which the same is deposited, said carriage automatically operated to carry the panel along and dump the same, the said carriage being provided with dumping shelves which are turned each on a horizontal axis to dump the work at an appointed position.

4. A work conveyor and stacking apparatus for panels, having in combination conveying means for conveying the panel to a position and causing the same to leave the end of the conveyor, a carriage onto which the same is deposited, said carriage automatically operated to carry the panel along and dump the same, the said carriage being provided with dumping shelves which are turned each on a horizontal axis to dump the work at an appointed position, a cam with a cam slot having an inclined end being attached to each dumping shelf and a cam roll arranged to be engaged by the cam slot to turn the dumping shelf through a quarter of a turn to dump the work.

5. A work conveyor and stacking apparatus for panels, the combination of a belt conveyor inclined upwardly for carrying a sheet metal panel to an elevation and dropping the same but leaving the panel in an upright but inclined position at the end of the conveyor, blocks on which the conveyor drops, pushing apparatus with a control device operated by the said blocks when the work panel drops on the same, said pushing apparatus serving to push the panel over into an inverted position, a carriage onto which the inverted panel drops and a control device comprising means initiated by a trip when the panel falls over on the carriage to afford motive power for the carriage to move the same away from the conveyor.

6. A work conveyor and stacking apparatus for panels, the combination of a belt conveyor inclined upwardly for carrying a sheet metal panel to an elevation and dropping the same but leaving the panel in an upright but inclined position at the end of the conveyor, blocks on which the conveyor drops, pushing apparatus with a control device operated by the said blocks when the panel drops on the same, said pushing apparatus serving to push the panel over into an inverted position, a slide on which the inverted panel drops and a control device comprising means initiated by a trip when the panel falls over on the slide to afford motive power for the slide to move the same away from the conveyor and also return the pushing apparatus to its original position.

7. A work conveyor and stacking apparatus for panels, the combination of a belt conveyor inclined upwardly for carrying a sheet metal panel forward, a slide onto which the panel is deposited, a control device comprising means operated by the panel as it is deposited upon the slide to afford motive power for the slide to move the same away from the conveyor and rotary dumping shelves carried on the slide which are caused to rotate as the slide moves away from the conveyor and thereby dump the work panel from the slide.

8. A conveyor and stacking apparatus for panels, the combination of a belt conveyor inclined upwardly for carrying a sheet metal panel to an elevation and dropping the same but leaving the panel in an upright but inclined position at the end of the conveyor, blocks on which the conveyor drops, pushing apparatus with a control device operated by the said blocks when the work panel drops on the same, said pushing apparatus serving to push the panel over into an inverted position, a slide onto which the inverted panel drops, a control device comprising means operated by the panel as it falls over onto the slide to afford motive power for the slide to move the same away from the conveyor, rotary dumping shelves carried on the slide which are caused to rotate as the slide moves away from the conveyor and thereby dump the work panel from the slide and a control device and apparatus operated by the panel for giving motive power for the slide to return it to its initial position.

9. A work conveyor and stacking apparatus for panels, having in combination means for conveying the panel to an elevated position and dropping the same off the end of a conveyor in a substantially upright position so that it can fall over to reverse the same and a carriage onto which the same drops when reversed, said carriage automatically operated to convey the panel away from said conveying means and provided with invertible supporting devices to dump the same.

10. In a combined conveyor and stacker, the combination of a conveying means, a carriage provided with invertible supports onto which a panel brought forward on the conveying means is deposited and a trip member combined with control means and actuating means tripped when the work panel is deposited on the carriage, said last mentioned means serving to move the carriage away from the conveyor and invert the supports upon a given travel of the carriage to deposit the panel on a stack and a stacking frame for cooperating with the slide and for guiding the panel as it is dropped from the slide to build up the stack in an orderly way.

EDWIN L. GRAF.